United States Patent [19]

Bouwhuis et al.

[11] 4,446,548
[45] May 1, 1984

[54] APPARATUS FOR THE POINT-BY-POINT SCANNING OF AN OBJECT

[75] Inventors: Gijsbertus Bouwhuis; Josephus J. M. Braat, both of Eindhoven, Netherlands

[73] Assignee: U.S. Philips Corporation, New York, N.Y.

[21] Appl. No.: 313,418

[22] Filed: Oct. 21, 1981

[30] Foreign Application Priority Data

Jul. 24, 1981 [NL] Netherlands ............. 8103505

[51] Int. Cl.$^3$ ............................................. G11B 11/00
[52] U.S. Cl. .................................. 369/109; 369/101; 369/124
[58] Field of Search ............. 369/109, 46, 60, 124, 369/101, 111; 250/578; 358/342

[56] References Cited

U.S. PATENT DOCUMENTS

| 4,025,784 | 5/1977 | Lehureau | 369/46 |
| 4,171,879 | 10/1979 | Bricot | 369/109 |
| 4,349,901 | 9/1982 | Howe | 369/109 |
| 4,366,564 | 12/1982 | Haon | 369/60 |

OTHER PUBLICATIONS

"System Coding Parameters Mechanics & Electromechanics of the Reflective Videodisc Player" SMPTE Journal, Feb. 1977, vol. 86, pp. 74–79, by Bogels.
"The Philips 'VLP' System" by Componn, pp. 178–180, Philips Technical Review, vol. 33, 1973, No. 7.
Philips Technical Review, vol. 37, 1977, No. 1, pp. 1–9, by Dekkers.
"Microwaves, Acoustics & Scanning Microscopy" by C. F. Quate, pp. 23–55.
"The Scanning X-Ray Microscope . . . " by Spiller, pp. 365–391.
"Theory & Application of Digital Signal Processing", by Pobiner et al., Prentice Hall, Inc. ©1975, pp. 40–46.
"Position Sensing in Video Disk Readout", by Braat et al., pp. 2013–2021, Jul. 1978, vol. 17, No. 13, Applied Optics.

*Primary Examiner*—Alan Faber
*Attorney, Agent, or Firm*—Thomas A. Briody; Robert T. Mayer; Algy Tamoshunas

[57] ABSTRACT

An apparatus is described for point-by-point scanning of an object, which may be a phase object, an amplitude object or a combined amplitude and phase object. The object is scanned with a light, sound, electron or X-ray beam which is converged to a spot on the object. A pair of detectors disposed in the path of the modulated radiation coming from the object convert the variations in the radiation into corresponding electrical signals which are fed to a summing circuit. A variable phase shifter connected between at least one of the detectors and the summing circuit is used to introduce a phase shift in the electrical signal such as to optimize the output signal of the summing circuit for the type of object being scanned.

15 Claims, 7 Drawing Figures

APPARATUS FOR THE POINT-BY-POINT SCANNING OF AN OBJECT

The invention relates to an apparatus for the point-by-point scanning of an object, which apparatus comprises a radiation source producing a scanning beam, an objective system for focussing the scanning beam so as to form a radiation spot on the object, and a radiation-sensitive detection system for converting the scanning beam coming from the object into an electric signal for an electronic processing circuit, which circuit renders the signal suitable for reproduction, which detection system comprises at least two radiation-sensitive detectors arranged after each other in the scanning direction.

This apparatus may be an optical microscope, an acoustic microscope, an electron-microscope or an X-ray microscope. Thus, said scanning beam may be a beam of electromagnetic radiation, an acoustic-wave beam or a particle beam. The term objective system should be taken in a broad sense and is defined as a system which narrows a beam of one of the said types of radiation to a very small scanning spot of the order of magnitude of the wavelength of the radiation used and of the order of magnitude of the object details to be detected. Obviously, the detection system should be adapted to the radiation source used.

The Applicant's Netherlands Patent Application no. 78 03517 corresponding to U.S. application Ser. No. 419,640, filed Sept. 17, 1982, which has been laid open to public inspection, describes an apparatus for scanning an optical record carrier having an information structure comprising information areas arranged in tracks with a small read spot. The information structure has the form of a phase structure and adjacent information tracks differ from each other in that the information areas of a first information track comprise comparatively deep pits and the information areas of an adjacent track comprise pits of a smaller depth. For correctly reading the two kinds of information areas two different read methods must be used. The read apparatus comprises two radiation-sensitive detectors which are disposed in the far field of the information structure, namely after each other in the direction of scanning. For reading the deeper phase structure the output signals of the two detectors are added to each other, whilst for reading the shallower phase structure said signals are subtracted from each other. The read methods are known as the integral method and the differential method respectively.

Since the two read methods have different optical transfer functions (M.T.F.), the alternate use of the two read methods may affect the signal ultimately supplied by the read apparatus. If a video signal is stored on the record carrier, for example, the one transfer function will give rise to different grey shades or a different colour saturation in the resulting television picture than the other transfer function. Moreover, the picture obtained by subtracting the signals from the two detectors is the first derivative of the object, so that object structures of lower spatial frequencies are not reproduced in an optimum manner. Hence, it is desirable to read an optical record carrier with two different phase structures by means of a single read method, the transfer function being preferably variable as a function of the frequency.

The information pits read by the integral method may have such an optical depth that they produce a phase difference of 180° between the zero-order beam and one of the first-order sub-beams, which are produced when the read spot is projected onto such a pit. Such a phase difference will also arise if the read spot scans an amplitude structure. A detector arrangement employed in the read apparatus in accordance with the said Netherlands Patent Application no. 78 03517 may therefore be used in an optical microscope by means of which both phase and amplitude objects are scanned.

It is an object of the present invention to provide a variable detection function for an apparatus for the point-by-point scanning of an object, so that such an apparatus becomes suitable for scanning objects of different structures, that is, a phase structure, an amplitude structure or a structure which is a combination of a phase structure and an amplitude structure.

The scanning apparatus in accordance with the invention, which comprises at least two detectors which are shifted relative to each other in the scanning direction, is characterized in that a phase-shifting element with a variable phase shift is arranged in at least one of the connections between the detectors and the input terminals of an additive input stage of the processing circuit.

The electronic phase shift provides a complex detection function, which can simply be adapted by electronic means. The detection function is to be understood to mean the transfer function of the system comprising the radiation-sensitive detectors and the additive input stage of the electronic processing circuit.

The principle of the invention may be applied to all kinds of scanning devices, not only to optical scanning devices, but also to scanning devices in which an acoustic beam, an electron beam or an X-ray beam is employed as scanning beam.

It is to be noted that in the article: "A detection method for producing phase and amplitude images simultaneously in a scanning transmission electron microscope" in "Philips Technical Review" Vol. 37, No. 1, pages 1–9, a scanning electron microscope is described comprising two detectors which are shifted relative to each other in the scanning direction, by means of which both a phase image and an amplitude image of an object can be obtained. A phase image is obtained by subtracting the detector signals from each other and an amplitude image by adding said signals to each other. In the known electron microscope the detectors are not connected to an electronic phase shifter, so that said microscope is not as versatile as the scanning apparatus in accordance with the invention.

In the scanning apparatus a phase-shifting element may be arranged between only one detector and one input terminal of the processing circuit. For reasons of symmetry, a preferred embodiment of the apparatus in accordance with the invention is further characterized in that a variable phase shifter is arranged in each of the connections between the detectors and the associated input terminals of the input stage, the phase shifts introduced by said phase shifters being equal but of opposite sign.

The modulus of the scanning signal, supplied by the additive input stage, it optimized by said phase shift. If the phase of only one of the detector signals is shifted, this also affects the phase of the scanning signal. The phase of the scanning signal can be restored if the scanning device is further characterized in that the output of the additive input stage is connected to a phase shifter which produces a phase shift $-\phi_e/2$, where $\phi_e$ is the phase shift produced by a single phase shifter arranged in one of the connections between the detectors and the input terminals of the input stage.

If the scanning apparatus is further characterized in that the additive input stage is connected to a phase shifter which introduces a phase shift which depends on a phase asymmetry in the scanning spot, said asymmetry which may be caused by coma of the optical system, can be compensated for.

The phase-shifting elements may be of different construction, depending on the desired field of application of the scanning apparatus. A first and simple embodiment of the scanning apparatus in accordance with the invention is characterized in that the phase-shifting elements are switchable between two substantially fixed values which correspond to a phase image and an amplitude image of the object.

A second embodiment of the scanning apparatus, which offers more possibilities, is characterized in that the phase-shifting elements are continuously variable. By means of this scanning apparatus it is possible to obtain an optimum reproduction of both shallow phase objects and amplitude objects, but also of objects whose structure is a combination of a phase structure and an amplitude structure. Moreover, this apparatus has the possibility of suppressing object details having a specific phase depth, that is the possibility of applying a phase-filtration.

In accordance with a further characteristic feature of the scanning apparatus, the phase shifts of the phase-shifting elements are a function of the spatial frequency in the object. Then it is possible to compensate for scanning-spot asymmetry as a result of errors in the scanning-beam sphericity.

If, in accordance with a further characteristic feature of the scanning apparatus, the gain of the input stage of the processing circuit is a function of the spatial frequency in the object, details of a specific spatial frequency may be suppressed or may be enhanced during reproduction.

When a complex detection function as obtained in the foregoing is used, whose amplitude and phase are electronically variable as a function of the frequency, spatial filtering of the object or image enhancement can be obtained without the use of complex optical filters.

The scanning apparatus may be further characterized in that the input stage of the processing circuit comprises separate amplifiers for each of the detector signals and an adder circuit, the gain factor of each of the amplifiers being adjustable. Then it is possible to compensate for an amplitude asymmetry in the scanning beam or to adopt a so-called single side-band principle.

The invention will now be described in more detail, by way of example, on the basis of an optical scanning apparatus, which is, for example, used for reading an optical record carrier. For this reference is made to the drawing. In the drawing.

Figure 1:
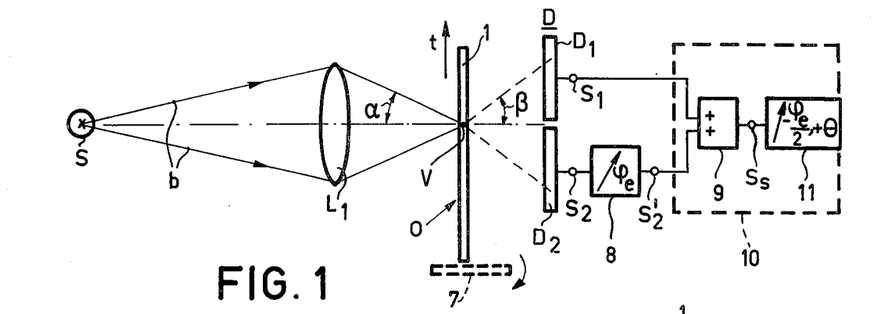
FIG. 1 shows a first embodiment of a scanning apparatus in accordance with the invention.

FIG. 1 illustrates the principle of the scanning apparatus. By means of an objective system, which is schematically represented by a single lens $L_1$, the beam b emitted by a radiation source S is focussed to form a radiation spot V on the object O to be scanned. Said object splits the incident beam b into a plurality of sub-beams of different diffraction orders, of which for the present description the non-deflected zero order sub-beam and the first-order subbeams are most important.

Figure 2:
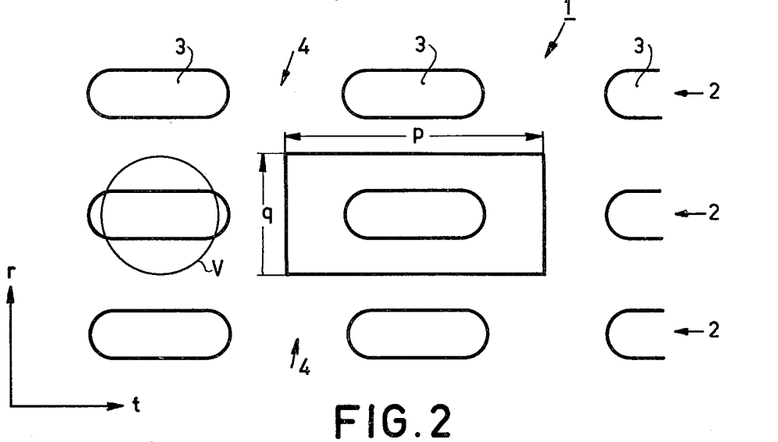
FIG. 2 shows a part of the information structure of an optical record carrier.

In FIG. 1 the object O is represented very schematically. Said object may for example be an optical record carrier having an information structure comprising information areas arranged in information tracks. FIG. 2 is a plan view of a small part of such a record carrier 1. In the case of a round disk-shaped record carrier the information tracks 2, which are represented as straight tracks, are in reality concentric tracks or quasi concentric tracks which together constitute one spiral track. The information tracks comprise very small information areas 3, whose lengths are of the order of 1 $\mu$m and whose widths are smaller than 1 $\mu$m, which areas alternate with intermediate areas 4 in the track direction t. It may be assumed that the information structure is periodic in two mutually orthogonal directions, the period in the track direction, or tangential direction, t being p and that in a direction transverse to the track direction, or radial direction, r being q. In the case of a record carrier in which a frequency-modulated video signal is stored the period p is determined by the video signal. The period q is equal to the distance between the tracks.

The information structure may be a pure phase structure, the information areas comprising pits pressed into the record-carrier surface or hills which project from said surface. Alternatively, the information structure may be an amplitude structure. Then the information areas, for example, comprise non-reflecting areas in a reflecting surface or radiation-absorbing or reflecting areas in an otherwise transparent record carrier.

In FIG. 2 the read spot is designated V. The width of said spot is of the order of magnitude of the dimensions of the information areas 2. The information structure behaves as a two-dimensional diffraction grating. Said grating splits the read beam b into a zero-order sub-beam, a number of first-order sub-beams, and a plurality of higher-order sub-beams. For reading the information areas 3 mainly the zero-order subbeam b(0,0) and the two first-order subbeams b(+1,0) and b(−1,0), which are diffracted in the tangential direction t, are of interest. In FIG. 1 the record carrier should then be thought to occupy the position of the object O, the tangential direction t being the vertical direction. During reading the record carrier is rotated about an axis 7.

Figure 3:
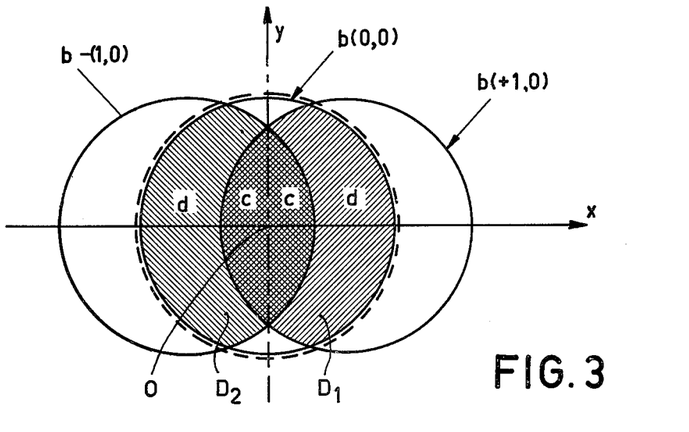
FIG. 3 shows sectional views, in the plane of the detectors, of the difracted beams produced when scanning the record carrier.

FIG. 3 represents cross-sections of the beams b(0,0), b(+1,0) and b(−1,0) in the plane of the detector D. The x and y axes in FIG. 3 respectively correspond to the tangential direction t and the radial direction r in FIG. 2. The beams returning from the record carrier b(0,0), b(+1,0) and b(−1,0) have complex amplitudes, which may be represented by:

B(0,0)
B(+1,0) exp (−i$\omega$t)
B(−1,0) exp (+i$\omega$t)

It is assumed that the record carrier moves with a constant angular velocity, which gives rise to the timedependent phase factor exp ($\pm i\omega t$). Here $\omega$ is a time frequency, which is determined by the angular velocity and the spatial frequency, in the tangential direction, of the information areas. Furthermore, it is assumed that no tracking errors occur. If the information areas are symmetrical in the radial direction and the tangential direction, then $B(+1,0)$ is equal to $B(-1,0)$.

There is a specific phase difference $\psi_{10}$ between the complex amplitudes $B(+1,0)$, $B(-1,0)$ and the amplitude $B(0,0)$. Said phase difference mainly depends on the phase retardation of radiation from the bottom of an information pit relative to radiation from the surface of the information layer, that is, on the optical depth of the information pits or the optical height of the information hills.

As is described in Netherlands Patent Application no. 78 03517, the information areas may have an optical depth such that said phase difference $\psi_{10}=180°$, or an optical depth such that $\psi_{10}=90°$. For $\psi_{10}=90°$ the pits are very shallow, so that the amplitudes of the diffracted beams are very small. Suitably, the optical depth is selected to be slightly greater, so that $\psi_{10}$ is between 110° and 120°. As already described in the article "Position-sensing in video-disk read-out" in: "Applied Optics", Vol. 17, No. 13, pages 2013–2021, an amplitude structure behaves in the same way as a phase structure whose information areas introduce a phase difference of $\psi_{10}=180°$.

As will be explained hereinafter, the scanning apparatus in accordance with the invention is suitable for reading both an amplitude information structure, or a deep phase information structure ($\psi_{10}=180°$), and a shallow phase information structure ($\psi_{10}=90°$). For this purpose, as is shown in FIG. 1, the detector D is divided into two subdetectors $D_1$ and $D_2$, whose outputs are connected to the input terminals of a summing device 9, which constitutes the input stage of an electronic processing circuit 10, which is known per se. Such a circuit is, for example, described in the article: "Signal Processing in the Philips' VLP system" in: "Philips' Technical Review", Vol. 33, No. 7, pages 178–180. In FIG. 3 the subdetectors $D_1$ and $D_2$ are represented by the dashed circle halves. In accordance with the invention an element 8 is arranged between the detector $D_2$ and the summing device 9, which element shifts the phase of the signal from the detector $D_2$ through an angle $\phi_e$.

The phase differences $\phi(+1,0)$ and $\phi(-1,0)$ between the first-order beams ($b(+1,0)$, $b(-1,0)$) and the zero order beam may be represented by;

$\phi(+1,0) = \psi_{10} + \omega t$
$\phi(-1,0) = \psi_{10} - \omega t$ and the complex amplitudes may be written as $B(0,0) = |B(0,0)|$
$B(+1,0) = |B(+1,0)| \exp i(\psi_{10}+\omega t)$
$B(-1,0) = |B(-1,0)| \exp i(\psi_{10}-\omega t)$ The intensity variations as a result of interference between the first-order subbeams and the zero-order subbeam at the location of the detectors $D_1$ and $D_2$ are converted into electric signals $S_1$ and $S_2$ by said detectors.

Within the detector area different areas may be distinguished, namely two areas d, represented by simple hatching, in which a first-order subbeam interferes with the zero-order subbeam, and two areas c, represented by cross-hatching, in which in addition to interference between a first-order subbeam and the zero order subbeam interference occurs between the two first-order subbeams. The areas c and d may be related to the well-known modulation transfer function (MTF) of an optical system without aberrations. The modulation transfer function, hereinafter designated M, may be assumed to correspond to the area of overlapping of the two relevant orders.

At the location where a first-order subbeam interferes with the zero-order subbeam, that is, in an area the size of $2c+d$, the transfer function $M(v)$ is valid, where $v$ is the spatial frequency of the information areas. At the location where the two first-order subbeams interfere, that is, in an area the size of $2c$ in FIG. 3, the transfer function $M(2v)$ is valid. Hence $2c+d = M(v)$
$2c = M(2v)$, so that
$d = M(v) - M(2v)$, and
$c = \frac{1}{2}M(v)$.

For determining the signals $S_1$ and $S_2$ the contributions provided by the areas c and d should be added to each other. Within the area c parts of the zero-order subbeam and parts of the two first-order subbeams are located. Within the area d a part of the zero-order subbeam and a part of one of the first-order subbeams are located. The signal $S_1$ may therefore be represented by:

$$S_1 \sim |B(0,0) + B(+1,0) + B(-1,0)|_c^2 + |B(0,0) + B(-+1,0)|_d^2$$

where the indices c and d denote that the relevant contributions should be weighted with the magnitudes of the areas c and d. For the information signal itself the d.c. components of the expression for $S_1$ are of less significance, so that said components may be ignored. The signal $S_1$ then becomes:

$$S_1 = 2Re\{B(0,0) \cdot B^x(+1,0)\}_c + 2Re\{B(0,0) \cdot B^x(-1,0)\}_c + 2Re\{B(0,0)B^x(+1,0)\}_d$$

Here, Re represents the real part of the relevant component. If the areas c and d are replaced by the MTF's, then $S_1$ becomes:

$$S_1 = M(2v) \cdot |B(0,0)| \, |B(+1,0)| \cdot \{\cos(\psi_{10}+\omega t) + \cos(\psi_{10}-\omega t) + 2|B(0,0)| \, |B(1,0)| \{M(v) - M(2v)\} \cdot \cos(\psi_{10}+\omega t).$$

Here it is assumed that the information areas are symmetrical, so that $|B(-1,0)| = |B(+1,0)|$. The signal $S_1$ is proportional to: (indicated by the sign: $\alpha$)

$$S_1 \alpha 2[M(v) - M(2v)] \cdot \cos(\psi_{10}+\omega t) + 2M(2v)\cos\psi_{10} \cos\omega t.$$

Similarly, the signal $S_2$ from the detector $D_2$ may be written as:

$$S_2 \alpha 2[M(v) - M(2v)] \cos(\psi_{10}-\omega t) + 2M(2v)\cos\psi_{10} \cos\omega t.$$

The signal $S_2$ is subject to a phase shift $\phi_e$, which yields the signal $S_2'$.

$$S_2' \alpha 2[M(v) - M(2v)] \cdot \cos(\psi_{10}-\omega t - \phi_e) + 2M(2v)\cos\psi_{10} \cdot \cos(\omega t + \phi_e).$$

The sum signal $S_s$ is given by:

$$S_s \alpha 4 [M(v) - M(2v)] \cos\left(\psi_{10} - \frac{\phi_e}{2}\right) \cos\left(\omega t + \frac{\phi_e}{2}\right) +$$

-continued $$4M(v)\cos(\psi_{10})\cdot\cos\left(\frac{\phi_e}{2}\right)\cos\left(\omega t+\frac{\phi_e}{2}\right),$$

or $$S_s\alpha\left[4M(v)\cdot\cos\left(\psi_{10}-\frac{\phi_e}{2}\right)+4M(2v)\cdot\sin(\psi_{10})\cdot\sin\left(\frac{\phi_e}{2}\right)\right]\cos\left(\omega t+\frac{\phi_e}{2}\right).$$

For reading an amplitude structure or a deep phase structure, in which $\psi_{10}=180°$, $\phi_e$ is selected 0°. Then, the sum signal is:

$$S_s\phi-4M(v)\cos\omega t.$$

For a phase difference $\psi_{10}$ which is constant over the entire record carrier and for a constant angular velocity of the record carrier, the signal $S_s$ only depends on the spatial frequency $v$ of the information areas in the track direction, that is on the information signal stored.

For reading a shallower phase structure where $\psi_{10}=90°$, $\phi_e=180°$ is selected. Then;

$$S_s\alpha-4[M(v)+M(2v)]\sin\omega t.$$

At a constant phase difference and a constant angular velocity this signal only depends on the spatial frequency $v$. The image of the shallow phase structure is the first derivative of the structure itself, whilst the image of the amplitude structure appears in the normal non-differentiated manner.

Figure 4:
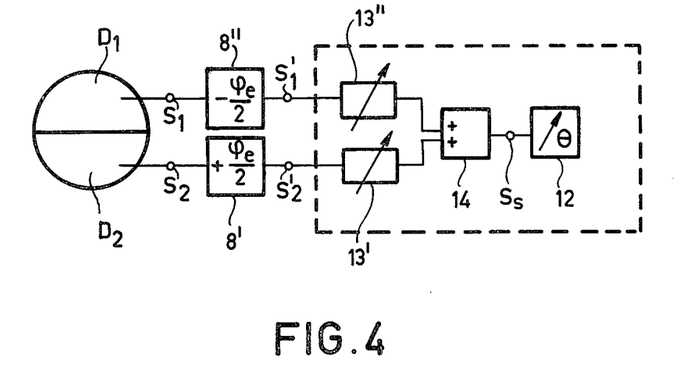
FIG. 4 represents a method of processing the detector signals.

Instead of shifting the phase of one detector signal through $\phi_e$, preferably the phase of $S_2$ is shifted through $+\phi_e/2$ and that of $S_1$ through $-\phi_e/2$ for reasons of symmetry, as is shown in FIG. 4. The signals $S_1'$ and $S_2'$ are then given by:

$$S_1'\alpha 2[M(v)-M(2v)]\cdot\cos\left(\psi_{10}+\omega t-\frac{\phi_e}{2}\right)+$$

$$2M(2v)\cos\psi_{10}\cdot\cos\left(\omega t-\frac{\phi_e}{2}\right)$$

$$S_2'\alpha 2[M(v)-M(2v)]\cos\left(\psi_{10}-\omega t-\frac{\phi_e}{2}\right)+$$

$$2M(2v)\cos(\psi_{10})\cdot\cos\left(\omega t+\frac{\phi_e}{2}\right)$$

and the sum signal $S_s$ by $$S_s\alpha 4[M(v)-M(2v)]\cdot\cos\left(\psi_{10}-\frac{\phi_e}{2}\right)\cdot\cos\omega t+$$

$$4M(2v)\cdot\cos\psi_{10}\cdot\cos\omega t\cdot\cos\frac{\phi_e}{2},$$

or $$S_s\alpha\left[4M(v)\cos\left(\psi_{10}-\frac{\phi_e}{2}\right)+4M(2v)\sin\psi_{10}\sin\frac{\phi_e}{2}\right]\cos\omega t$$

for $\psi_{10}=180°$ and $\phi_e=0°$:
$S_2\alpha-4M(v)\cos\omega t$ is valid, whilst for
$\psi_{10}=90°$ and $\phi_e=180°$
$S_s\alpha[4M(v)+4M(2v)]\cos\omega t$ is valid.

In this case the image of the shallow phase structure also appears in the normal, undifferentiated manner.

In the description of the principle in accordance with the invention the higher-order subbeams have been left out of consideration. The higher-order beams are largely diffracted outside the detector and the amplitudes of said beams are substantially smaller than those of the first-order beams, so that the influence of higher-order beams is negligible in a first-order approximation.

An information structure whose information areas introduce in a phase difference $\psi_{10}=90°$ is a theoretical structure. As already stated, the diffracted beams produced by such a structure have a low amplitude, so that the signal $S_s$ is very weak. Therefore, in practice an optical depth is selected which is such that the phase angle is slightly greater than 90°, for example $110°\leq\phi_{10}\leq 120°$. For $\psi_{10}=120°$ the term with $M(v)$ in the expression for $S_s$ is a maximum for $\phi_e=120°$. If the phase of only one of the detector signals is shifted through 120°, the phase of the signal $S_s$ is shifted through 30° relative to the signal $S_s$ for $\psi_{10}=90°$.

The apparatus described in the foregoing, which comprises one or two phase shifters which can be switched between two positions, which apparatus may be regarded as a scanning apparatus with a detection function which can be switched to two states, is a special embodiment of the general inventive concept of providing a scanning apparatus with a complex and variable detection function which, within the detector area, may be represented by:

$g(x,y)=a$ for $x>0$ $g(x,y)=a,\exp(i\phi_e)$ for $x<0$ or by:

$g(x,y)=a.\exp(-i\phi_e/2)$ for $x>0$ $g(x,y)=a.\exp(+i\phi_e/2)$ for $x<0$

Outside the detector area $g(x,y)=0$.

The imaging function of the scanning apparatus in accordance with the invention is the product of the so-called optical transfer function (OTF) of the optical system and a further transfer function F, whose modulus and phase are:

$$|F|=a\left[\cos\left(\psi_{10}\cdot\frac{\phi_e}{2}\right)+\sin\psi_{10}\cdot\sin\frac{\phi_e}{2}\right].$$

$\arg\{F\}=\frac{\phi_e}{2}$ for the asymmetrical situation $\arg\{F\}=0$ for the symmetrical situation.

In the asymmetrical situation the phase of only one of the detector signals is shifted, namely through $\phi_e$, whilst in the symmetrical situation the phase of each of the two detector signals is shifted through $+\phi_e/2$ and $-\phi_e/2$ respectively.

The electronic phase shift $\phi_e$ is utilized in order to optimize the modulus of the signal $S_s$:

$$\cos\left(\psi_{10} - \frac{\phi_e}{2}\right) + \sin\psi_{10} \sin\frac{\phi_e}{2}$$

In the symmetrical situation the argument will not change owing to the modulus optimization. However, such a change does occur in the asymmetrical situation. The change of the argument can be eliminated by arranging an additional phase shifter 11 after the summing device 9, which phase shifter introduces a phase shift of $-\phi_e/2$, as is shown in FIG. 1.

Both in the asymmetrical situation and in the symmetrical situation the phase of the signal $S_s$ may be influenced by a phase asymmetry in the scanning spot V. The principal cause of such an asymmetry is coma of the optical system. Compensation for this phase error is possible by shifting the phase of the signal $S_s$ through $\theta$, where $\theta$ is a function of the said phase asymmetry. In the preferred embodiment of FIG. 4 an additional phase shifter 12 is then arranged after the summing device 9. In the asymmetrical situation of FIG. 1 the phase shifter 11 is then adapted so that it produces a phase shift through $\theta - \phi_e/2$.

The phase shift $\phi_e$ is generally variable between 0 and 360°. For a read apparatus which should be capable of reading both record carriers having a phase structure and record carriers having an amplitude structure, or record carriers with phase structures of different depths, such a continuous electronic phase shift over a wide range is not needed. However, this will be different for an optical microscope, which serves for visualizing not only shallow phase structures or amplitude structures but also all kinds of intermediate structures, that is, structures which are neither pure phase structures nor pure amplitude structures.

The phase depth of the objects to be observed by means of such a microscope, for example, biological tissues or organisms, need not be known in advance. The object may be scanned a few times in succession, each time using a different value for $\phi_e$ until a satisfactory image quality is obtained.

The objects to be observed with the microscope proposed here need not have such a constant phase depth as the optical record carriers mentioned in the foregoing. Said objects may comprise parts which each have a different phase depth. The object may then be scanned several times, each time using a different value for the electronic phase shift $\phi_e$. During each scan a specific phase depth is reproduced with maximum contrast. The original object can then be reconstructed from all the individual images.

The phase shifters 8 in FIG. 1 and 8' and 8" in FIG. 4, may be devices whose phase shift is a function of the time frequency. At a constant scanning velocity a specific spatial frequency ($v$) in the object corresponds to a specific time frequency ($\omega$). Frequency-dependent phase shifters in the form of transversal digital filters are known per se, for other purposes, for example from the book: "Theory and application of digital Signal processing", Rabiner and Gold, Prentice-Hall Inc. 1975, inter alia page 40. When using such phase shifters it is possible to ensure that only for specific spatial frequencies the electronic phase shift has the value which is optimum for scanning. A result of this is that only structures of parts of the object with a specific spatial frequency are correctly reproduced, whilst parts of structures with a different spatial frequency are imaged in an attenuated form.

Furthermore, the gain of the adding circuit 9 can be made frequency-dependent, so that the desired spatial frequency can be further boosted and the undesired frequencies can be further attenuated.

By the use of frequency-dependent phase shifters and a frequency-dependent amplifier a spatial filtering of the object or an image enhancement can be achieved without the use of optical filters. The hitherto difficult problem in optical filtering, of manufacturing suitable optical filters, has been overcome by the use of electronic filters with the desired phase and amplitude characteristics which are easier to design.

The scanning apparatus may comprise two separate amplifiers for the detector signals $S_1$ and $S_2$. In FIG. 4 these amplifiers are designated 13' and 13". The detection function of a scanning apparatus comprising two separate frequency-dependent amplifiers and frequency-dependent phase shifters may be written as follows:

$$g(x,y) = a_1(v) \cdot \exp\left(-i\frac{\phi_e(v)}{2}\right) \text{ for } x > 0$$

$$g(x,y) = a_2(v) \cdot \exp\left(+i\frac{\phi_e(v)}{2}\right) \text{ for } x < 0$$

where $v$ is the spatial frequency in the object. The two separate amplifiers may be employed in order to compensate for an amplitude asymmetry in the scanning beam. When two separate amplifiers are used, it is possible to amplify one detector signal and to suppress the other signal, so that a so-called single side band principle is employed.

For scanning, in accordance with the invention, an object in two, for example, mutually perpendicular directions, the scanning spot can be made to describe a number of lines in a first direction. The data thus obtained may be stored in an image storage device. Subsequently, the scanning spot can be made to describe a number of lines in the second direction. Finally, the data of the scans in the two directions may be combined.

For scanning in two directions two detectors may be employed, the detectors and the object being rotated through 90° relative to each other upon the transition from the one scanning direction to the other. Alternatively, it is possible to employ four detectors, with one set being is used for the the other scanning direction and one set for the other scanning direction.

The present invention relates to the division of a detector into two subdetectors and to the method of electronically processing the signals supplied by the subdetectors. The invention is not limited to a specific type of scanning radiation, such as light. It is only of importance that the scanning radiation can be concentrated to form a small scanning spot. Apart from an optical microscope, the invention may be used in an electron microscope, an X-ray microscope or in an acoustic microscope, provided that said microscopes are aberration-free to a satisfactory extent. By means of these microscopes details are observed whose magnitude is at the limit of resolution of the relevant microscope.

Figure 5:
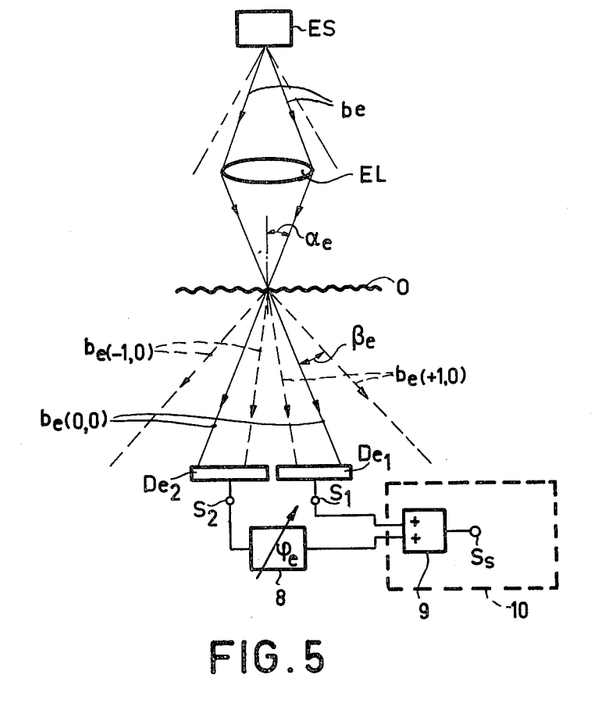
FIG. 5 illustrates the principle of an electron microscope in accordance with the invention.

FIG. 5 schematically represents an electron microscope. The electron source ES emits an electron beam $b_e$. This beam is focussed by an electron lens EL in the plane of the object O, which is for example a weak phase object. The object splits the beam $b_e$ into a zero-order subbeam $b_e$ (0,0) and into, inter alia, two first-order subbeams $b_e(+1,0)$ and $b_e(-1,0)$. The zero-order beam and parts of the first-order beams are received by two detectors $DE_1$ and $DE_2$, which convert the electron radiation into an electric signal. The angle $\beta_e$ through which the first-order subbeams are diffracted is of the same order of magnitude as the numerical aperture, which is equal to $\sin \alpha_e$, of the electron lens, in the same way as in the light microscope. The signals $S_1$ and $S_2$ from the detectors $DE_1$ and $DE_2$ are processed in the same way as described with reference to FIGS. 1 and 4.

Figure 6:
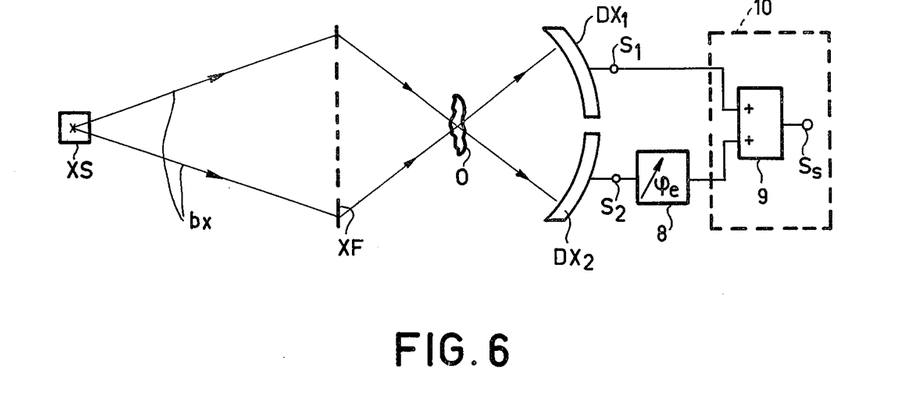
FIG. 6 illustrates the principle of an X-ray microscope in accordance with the invention.

FIG. 6, very schematically, represents an embodiment of an X-ray microscope. XS is the X-ray source, which, because it should be a bright source, suitably comprises a synchrotron. THe X-ray beam $b_x$ is focussed at the object, for example a biological specimen or a crystal structure. The focussing system XF may comprise a zone plate as is shown in FIG. 6, or a plurality of mirrors. The X-ray beam returning from the object is received by two X-ray detectors $DX_1$ and $DX_2$. The signals $S_1$ and $S_2$ from these detectors can be processed as described with reference to FIGS. 1 and 4. For further details on the X-ray source XS, the focussing system XF and the X-ray detectors $DX_1$ and $DX_2$, which components do not form part of the present invention, reference is made to the article: "The scanning X-ray microscope", pages 365–391 of the book: "Scanned image microscopy" E. A. Ash., Academic Press, 1980.

Figure 7:
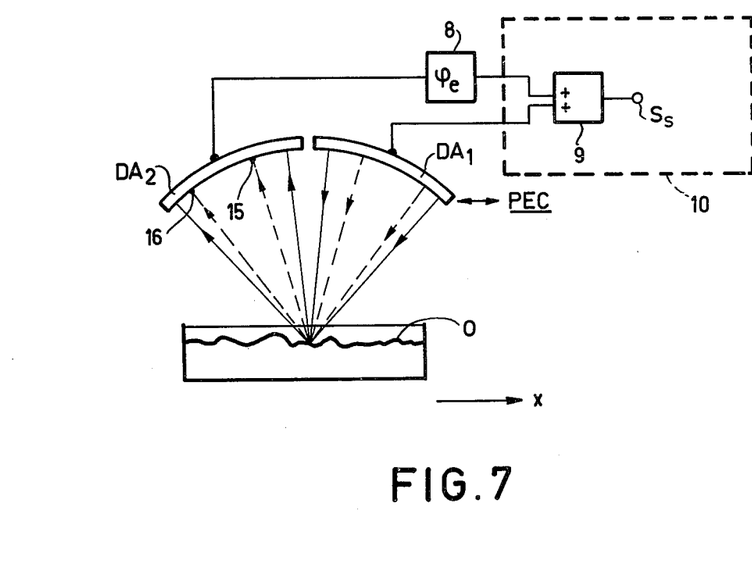
FIG. 7 represents the principle of an acoustic microscope in accordance with the invention.

FIG. 7 represents the principle of an acoustic microscope in accordance with the invention. Such a microscope comprises a piezo-electric transducer PEC, which has a uniform response over its entire surface area. By means of this transducer a sound wave is produced, which is aimed at the object to be examined, for example a reflecting layer. If the transducer is flat and the sound wave is a plane wave, an acoustic lens may be arranged between the object and the transducer, which lens converts the acoustic wave into a spherical, convergent wave. As is shown in FIG. 7, the transducer itself may be curved, so that the emitted sound wave is already convergent. The sound wave is reflected by the object and returns to the transducer, which converts the sound wave into voltage. Then, integration is effected over the entire surface area of the transducer. The transducer PEC thus functions as source and as detector. The input voltage and the output voltage are distinguished from each other in that short pulses are used.

The output voltage depends on the phases of the individual beam components. If a reflector is arranged in the plane of focussing, all beam components traverse the same pathlength and the beam components in points 15 and 16 are in phase. However, if the reflector is moved in a vertical direction, that is, if the surface O to be observed which exhibits vertical irregularities, moves in the x-direction, the various beam components will traverse different path-lengths and the beam components will exhibit a specific phase shift in 15 and 16, causing the output voltage to change.

For further details on the acoustic microscope, which in itself does not form part of the present invention, reference is made to the article: "Scanning acoustic microscopy", pages 24–55 of the said book: "Scanned image microscopy". In accordance with the invention the transducer is divided into two sections $DA_1$ and $DA_2$, $DA_1$ being connected direct to a summing device 9 and $DA_2$ via a phase-shifting element 8. The signal processing is identical to that in accordance with FIG. 1 or that in accordance with FIG. 4.

What is claimed is:

1. An apparatus for point-by-point scanning of an object which may be a phase object, an amplitude object or a combined amplitude and phase object, said apparatus comprising means for producing a scanning beam, means for converging said beam to a spot on the object, means for detecting variations in the beam coming from the object as the object is scanned by said spot, said detecting means including at least two detectors which convert the variations in said beam into corresponding electrical signals, said detectors being disposed in the path of the beam coming from the object and being arranged after each other in the scanning direction, means for adding said electrical signals from said detectors so as to obtain a further signal representative of the sum of said electrical signals and a variable phase shifter arranged between at least one of said detectors and said adding means for changing the phase of the electrical signal from said at least one detector so as to optimize said further signal for the type of object being scanned.

2. The apparatus according to claim 1 wherein a variable phase shifter is arranged between each of said detectors and said adding means, the phase shifts introduced by said phase shifters in the respective electrical signal being equal but of opposite sign.

3. The apparatus according to claim 2 including means for shifting the phase of said further signal by an amount such as to compensate for asymmetry of said spot.

4. The apparatus according to claim 1 including means for shifting the phase of said further signal by $-\phi e/2$, where $\phi_e$ is the phase shift produced by said phase shifter.

5. The apparatus according to claim 1 including means for shifting the phase of said further signal by $\theta - \phi e/2$, where $\phi_e$ is the phase shift produced by said phase shifter and $\theta$ depends on an asymmetry of said spot.

6. The apparatus according to claim 1 wherein the phase shift introduced into said electrical signal by said phase shifter varies as a function of the frequency of said variations in said beam.

7. The apparatus according to claims 1 or 6 including means for varying the amplitude of said electrical signals as a function of the frequency of said variations of said beam.

8. The apparatus according to claims 1 or 6 including an amplifier with variable gain connected between each of said detectors and said adding means for adjusting the gain of each of said electrical signals.

9. The apparatus according to claim 1 wherein the phase shift introduced in said electrical signal by said phase shifter is switchable between a first value which optimizes said further signal for the case of a phase object and a second value which optimizes said further signal for the case of an amplitude object.

10. The apparatus according to claim 1 wherein the phase shift introduced by said phase shifter is continuously variable.

11. The apparatus according to claim 1, 2, 4 or 6 wherein said scanning beam produced by said beam producing means is a light beam.

12. The apparatus according to claim 1, 2 or 4 wherein said beam producing means includes a source of electrons and said scanning beam produced by said beam producing means is an electron beam.

13. The apparatus according to claim 1, 2 or 4 wherein said beam producing means includes a source of x-rays and said scanning beam produced by said beam producing means is an x-ray beam.

14. The apparatus according to claim 1, 2 or 4 wherein said scanning beam produced by said beam producing means is an acoustic beam.

15. An apparatus for reading information from a record carrier having a plurality of adjacent tracks each comprising a plurality of information areas spaced apart in the track direction and defining either an amplitude structure or a phase structure, said apparatus comprising means for producing a beam of radiation, means for focussing said beam to a scanning spot on said record carrier, means for producing relative movement between said record carrier and said beam such that said spot scans a given track so as to produce variations in the radiation of said beam in accordance with the pattern of information areas in that track, means for detecting said variations in the radiation coming from said record carrier, said detecting means including at least two radiation sensitive detectors each of which converts said variations in the radiation into a corresponding electrical signal, said detectors being disposed in the path of the radiation coming from said record carrier and being arranged after each other in the scanning direction, means for adding said electrical signals so as to obtain a further signal representative of the sum of said electrical signals and a phase shifter arranged between at least one of said detectors and said adding means for introducing a phase shift into said electrical signal from said at least one detector, said phase shifter being switchable between a first state in which the phase of said electrical signal is shifted by a value such as to optimize said further signal for the case where said information areas define an amplitude structure and a second state in which the phase of said electrical signal is shifted by a value such as to optimize said further signal for the case where said information areas define a phase structure.

* * * * *